United States Patent [19]
Veltman et al.

[11] Patent Number: 5,321,508
[45] Date of Patent: Jun. 14, 1994

[54] VIDEO IMAGE DATA RECORDING APPARATUS

[75] Inventors: Mark Veltman, Tokyo; Jun Yonemitsu, Kanagawa, both of Japan

[73] Assignee: Sony Corporation, Tokyo, Japan

[21] Appl. No.: 911,513

[22] Filed: Jul. 10, 1992

[30] Foreign Application Priority Data

Jul. 12, 1991 [JP] Japan ................... 3-198561
Jul. 12, 1991 [JP] Japan ................... 3-198562

[51] Int. Cl.⁵ .................................. H04N 7/137
[52] U.S. Cl. .............................. 348/439; 348/155
[58] Field of Search ................... 358/105, 136; H04N 7/137

[56] References Cited

U.S. PATENT DOCUMENTS 5,175,618 12/1992 Ueda .......................... 358/136

FOREIGN PATENT DOCUMENTS 0313301 4/1989 European Pat. Off. ..... H04N 7/137
0395440 10/1990 European Pat. Off. ..... H04N 7/137

OTHER PUBLICATIONS

Puri, Aravind, Haskell and Leonardi, *Video Coding with Motion-Compensated Interpolation for CD-ROM Applications*, Signal Processing: Image Communication, vol. 2, No. 2, (Aug. 1990), at 127–144.

Sabri, *Movement Compensated Interframe Prediction for NTSC Color TV Signals*, IEEE Transactions on Communications, vol. COM-32, No. 8, (Aug. 1984), at 954–968.

*Primary Examiner*—Howard W. Britton
*Attorney, Agent, or Firm*—Lewis H. Eslinger; Jay H. Maioli

[57] ABSTRACT

A video image data decoding apparatus includes a pair of buffer memories for storing decoded intra coded picture data or forward prediction coded picture data, a switch circuit for selecting either the decoded intra coded picture data or forward prediction coded picture data to be sequentially stored in the pair of buffer memories, and a generating circuit utilizing picture data stored in one of the pair of buffer memories for generating picture data to be stored into another buffer memory and also utilizing picture data stored in one buffer memory for generating picture data to be newly stored again into the same buffer memory. The generating circuit performs motion compensation by utilizing picture data stored in one buffer memory for generating picture data to be stored into another buffer memory.

13 Claims, 10 Drawing Sheets

FIG. 3

| P6 | P6 | P6 | P6 | P6 | P6 | P6 | P6 |
|----|----|----|----|----|----|----|----|
| P6 | P6 | P6 | P6 | P6 | P6 | P6 | P6 |
| P6 | P6 | Io | Io | Io | Io | Io | Io |
| Io | Io | Io | Io | Io | Io | Io | Io |
| Io | Io | Io | Io | Io | Io | Io | Io |
| Io | Io | Io | Io | Io | Io | Io | Io |
| Io | Io | Io | Io | Io | Io | Io | Io |
| Io | Io | Io | Io | Io | Io | Io | Io |

VIDEO IMAGE DATA RECORDING APPARATUS

BACKGROUND OF THE INVENTION

1. Field of the Invention

The present invention relates to a video image data decoding apparatus (hereinafter briefly called "picture data decoder") suitable for use for example in reproducing picture data compressed and recorded in a recording medium such as a disk.

2. Description of the Related Art

Conventionally, when picture data were compressed, pictures were classed in three types: I picture, P picture, and B picture. The I picture (intra coded picture) is such that, when it is coded, it uses a set of closed data within one area (one frame) of the picture. Although the quantity of data increases when the I pictures are used, random access or high-speed reproduction can be achieved by scattering the I pictures in the picture data. The P picture (forward prediction coded picture) is such that it uses an I picture or a P picture which has already been decoded and temporally located forward as the prediction picture (the picture serving as a reference in obtaining a differentiaL). The B picture (bidirectional prediction coded picture) is such that it uses, as the prediction picture, three types of pictures: an I picture or a P picture which has already been decoded and temporally located forward, an I picture or a P picture which has already been decoded and temporally located backward, and an interpolated picture produced from both of them.

In the case shown in FIG. 6, for example, the pictures denoted by numerals 0 to 9 are compressed as I0, B1, B2, P3, B4, B5, P6, B7, B8, and P9. Here, character I denotes the I picture, character P denotes the P picture, and character B denotes the B picture, respectively. That is, the picture No. 0 is an I picture, the picture Nos. 3, 6, and 9 are P pictures, and the picture Nos. 1, 2, 4, 5, 7, and 8 are B pictures. For example, it is arranged such that the picture I0 is generated from the data of itself, the picture P3 is generated from the temporally forward picture I0, and the picture B1 is generated from both the temporally forward picture I0 and the temporally backward picture P3.

FIG. 5 is a block diagram showing an example of structure of a conventional picture data decoder for decoding such compressed picture data as described above. An inverse VLC circuit 1 gives an inverse VLC (inverse Variable Length Coding) treatment to picture data supplied from a picture data encoder, not shown, and outputs the data to an inverse quantization circuit 2. The inverse quantization circuit 2 performs inverse zigzag scanning on the data that has undergone the inverse VLC treatment, gives an inverse quantization treatment thereto, and outputs the treated data to an inverse DCT circuit 3. The inverse DCT circuit 3 gives an inverse DCT (inverse Discrete Cosine Transform) treatment to the input data and outputs the data to an adder circuit 4. In the adder circuit 4, there is present prediction picture data which has been selected by a switch 15 and input thereto through a gate 17, and this prediction picture data and the output data from the inverse DCT circuit 3 are added up and thereby decoded picture data is generated.

When the output from the adder circuit 4 is an I picture or a P picture, a gate 5 is opened and the output is supplied, through a switch 6, to a buffer memory 7 or a buffer memory 8 to be stored therein. The inverse VLC circuit 1 is supplied with such data as motion vector data, quantization width data, and coding mode data, in addition to the picture data. The inverse VLC circuit 1 controls a timing circuit 16 in accordance with such data. The timing circuit 16 generates various timing signals in accordance with outputs from the inverse VLC circuit 1 to thereby operate the gate 5 and the gate 17 and turn switches 6, 9, 10, and 15 to the sides of predetermined contacts. When the output from the adder circuit 4 is an I picture or a P picture, the switches 9 and 10 are turned to the side of the contact a. The switch 6 is adapted to be alternately turned to the sides of the contacts a and b so that the pictures output from the adder circuit 4 (I pictures or P pictures) are alternately stored into the pair of buffer memories 7 and 8.

For example, as shown in FIG. 6, the picture data in which pictures are arranged in the sequence of I0, B1, B2, P3, B4, B5, P6, B7, B8, P9 are processed in the encoder in the sequence of I0, P3, B1, B2, P6, B4, B5, P9, B7, B8. Accordingly, the data are input to the inverse VLC circuit 1 on the decoder side in the same sequence. As a result, if, for example, decoded data of the picture I0 is stored into the buffer memory 7, then decoded data of the picture P3 is stored into the buffer memory 8. Thereafter, the data of the piture I0 in the buffer memory 7 is updated to data of the picture P6 and the data of the picture P3 in the buffer memory 8 is updated to data of the picture P9.

When the data of the picture B1 or B2 is input from the inverse DCT circuit 3 to the adder circuit 4 in succession to the data of the picture I0 and picture P3, the data of the picture I0 stored in the buffer memory 7 is motion compensated in accordance with a motion vector in a motion compensation circuit 12 to be supplied to an interpolation circuit 14. At the same time, the data of P3 stored in the buffer memory 8 is motion compensated in accordance with a motion vector in a motion compensation circuit 13 to be supplied to the interpolation circuit 14. The interpolation circuit 14 combines the inputs from the motion compensation circuits 12 and 13 in the ratio according to data input from the inverse VLC circuit 1. The combined data is selected by the switch 15 and supplied to the adder circuit 4 through the contact b of the switch 15 and the gate 17. The adder circuit 4 adds up the data from the inverse DCT circuit 3 and the data selected by the switch 15 to thereby decode the picture B1 or B2.

When the picture B1 or B2 is decoded only from the forward picture I0, the switch 15 is turned to the side of the contact a, and when it is decoded only from the backward picture P3, the switch 15 is turned to the side of the contact c, whereby the data of the picture I0 and the picture P3 are respectively supplied to the adder circuit 4.

The switch 9 is adapted to be turned to the side opposite to the side of the switch 6. More specifically, when the switch 6 is turned to the side of the contact a (the contact b), the switch 9 is turned to the side of the contact b (the contact a). Therefore, when the switch 6 is turned to the side of the contact b and the picture P3 is stored into the buffer memory 8 after the picture I0 has been stored in the buffer memory 7, the switch 9 is turned to the side of the contact a. Since, at this time, the switch 10 is turned to the side of the contact a, the picture I0 is read from the buffer memory 7 and supplied, through the switches 9 and 10, to a display 11 to be displayed thereon. Since the switch 10 is turned to the side of the contact b when the picture B1 or B2 is output from the adder circuit 4, the picture B1 or B2 is supplied to the display 11. Then, the switch 9 is turned to the side of the contact b and the switch 10 is turned to the side of the contact a, whereby the picture P3 already stored in the buffer memory 8 is read out to be supplied to the display 11.

Thereafter, the same operations are repeated and all the pictures are sequentially output and displayed.

In the conventional apparatus, as described above, it is adapted, when data of a P picture is decoded, such that picture data stored in the other buffer memory of the pair of the buffer memories is read out. As a result, in the case where for example the pictures arranged in the sequence of pictures I0, B1, B2, P3, B4, B5, P6, B7, B8, and P9 are those of a person walking along a street with buildings for a background as shown in FIG. 7, if it is attempted to generate the picture of the area indicated by the window W1 in the picture P6 (the picture of buildings in the background) from the forward picture P3, then, because the person in the picture P3 is located in the position corresponding to the window W1 in the picture P6, the picture of the window W1 (the picture of the buildings in the background) cannot be obtained therefrom.

Similarly, when it is attempted to generate the picture in the area indicated by the window W2 (the picture of buildings in the background) in the picture P9 from the forward picture P6, then, because the person in the picture P6 is located in the position corresponding to the window W2 in the picture P9, the picture of the window W2 (the picture of the buildings in the background) cannot be obtained therefrom. Thus, the conventional apparatus has been unable to reproduce an accurate picture.

In other words, since it was arranged in the conventional apparatus to perform the forward prediction by utilizing the data stored in the other of one pair of buffer memories, there was a problem that it was difficult for the conventional apparatus to accurately reproduce the original picture.

SUMMARY OF THE INVENTION

The present invention has been made in view of the above described situation and an object of the present invention is to provide accurate reproduction of original pictures.

According to a first aspect of the present invention, there is provided a picture data decoder which comprises two or more storage means for storing two or more successive sets of decoded intra coded picture data or forward prediction coded picture data, storage control means for causing decoded intra coded picture data or forward prediction coded picture data to be sequentially stored in the two or more storage means, and generation means utilizing picture data stored in one of the two or more storage means for generating picture data to be stored into another storage means and also utilizing picture data stored in one storage means for generating picture data to be newly stored into the one storage means.

In one embodiment, the above storage means is constituted of a pair of buffer memories 7 and 8, the storage control means is constituted of a switch 6, and the generation means is constituted of motion compensation circuits 12 and 13, an interpolation circuit 14, a switch 15, an adder circuit 4, etc. As shown in FIG. 2, the embodiment is similar to the conventional picture data decoder except for the operation of the switch 15 as controlled by a timing circuit 16. Whereas the conventional picture data decoder as illustrated in FIG. 5 allows the timing circuit 16 to hold switch 15 only to the side of contact a when the switch 6 is held to the side of the contact b, the embodiment of the present invention allows the timing circuit 16 to turn the switch 15 to either contact a or contact c. FIG. 2 shows the embodiment with the switch 15 held to the side of contact c.

According to a second aspect of the present invention, the picture data decoder as the first aspect of the present invention is characterized in that the generation means thereof is adapted to perform motion compensation when it utilizes the picture data stored in one storage means for generating picture data to be stored into another storage means, and not to perform motion compensation within a predetermined range when it utilizes picture data stored in one storage means for generating picture data to be newly stored into the one storage means.

According to a third aspect of the present invention, there is provided a picture data decoder which comprises a pair of storage means for storing decoded intra coded picture data or forward prediction coded picture data, delay means for delaying picture data to be supplied to the storage means by at least a period of time corresponding to motion compensation, storage control means for causing picture data delayed by the delay means to be alternately stored in the pair of storage means, and generation means for generating picture data to be newly stored into one storage means of the pair of storage means by utilizing picture data stored in the one storage means.

In an embodiment, the above storage means is constituted of buffer memories 7 and 8, the delay means is constituted of a buffer memory 21 (shown in FIG. 8), the storage control means is constituted of a switch 6, and the generation means is constituted of motion compensation circuits 12 and 13, an interpolation circuit 14, a switch 15, an adder circuit 4, etc.

In the picture data decoder according to the first aspect of the present invention, picture data stored in one of the buffer memories 7 and 8 is utilized for generating picture data to be stored into the other of the buffer memories and, further, picture data stored in one of the buffer memories 7 and 8 is utilized for generating picture data to be newly stored in the one of the buffer memories. Therefore, more accurate picture reproduction can be attained.

In the picture data decoder according to the second aspect of the present invention, motion compensation is performed when picture data stored in one of the buffer memories 7 and 8 is utilized for generating picture data to be stored into the other of the buffer memories, and motion compensation is not performed when picture data stored in one of the buffer memories 7 and 8 is utilized for generating picture data to be newly stored in the one of the buffer memories. Therefore, it becomes possible to generate picture data to be newly stored into the buffer memory 7 or 8 by utilizing picture data stored in the same buffer memory.

In the picture data decoder according to the third aspect of the present invention, picture data are stored into the buffer memories 7 and 8 after being delayed in the buffer memory 21 by a period of time corresponding to motion compensation. By utilizing the picture data stored in the buffer memory 7 (or 8), the picture data to be newly stored into the buffer memory 7 (or 8) is generated. Therefore, long forward prediction can be achieved while motion compensation is performed so that more accurate picture reproduction can be attained.

BRIEF DESCRIPTION OF THE DRAWINGS

FIG. 3 is a diagram explanatory of operation for writing data into a buffer memory in FIG. 2;

FIG. 5 resembles FIG. 2 in every way except the position of the switch 15, specifically, when the switch 6 is held to the side of the contact b, the present invention embodied in FIG. 2 allows the timing circuit 16 to turn the switch 15 to either contact a or contact c, whereas the conventional picture data decoder as illustrated in FIG. 5 allows the timing circuit 16 to hold switch 15 only to the side of contact a during this time;

DESCRIPTION OF THE PREFERRED EMBODIMENTS

Figure 2:
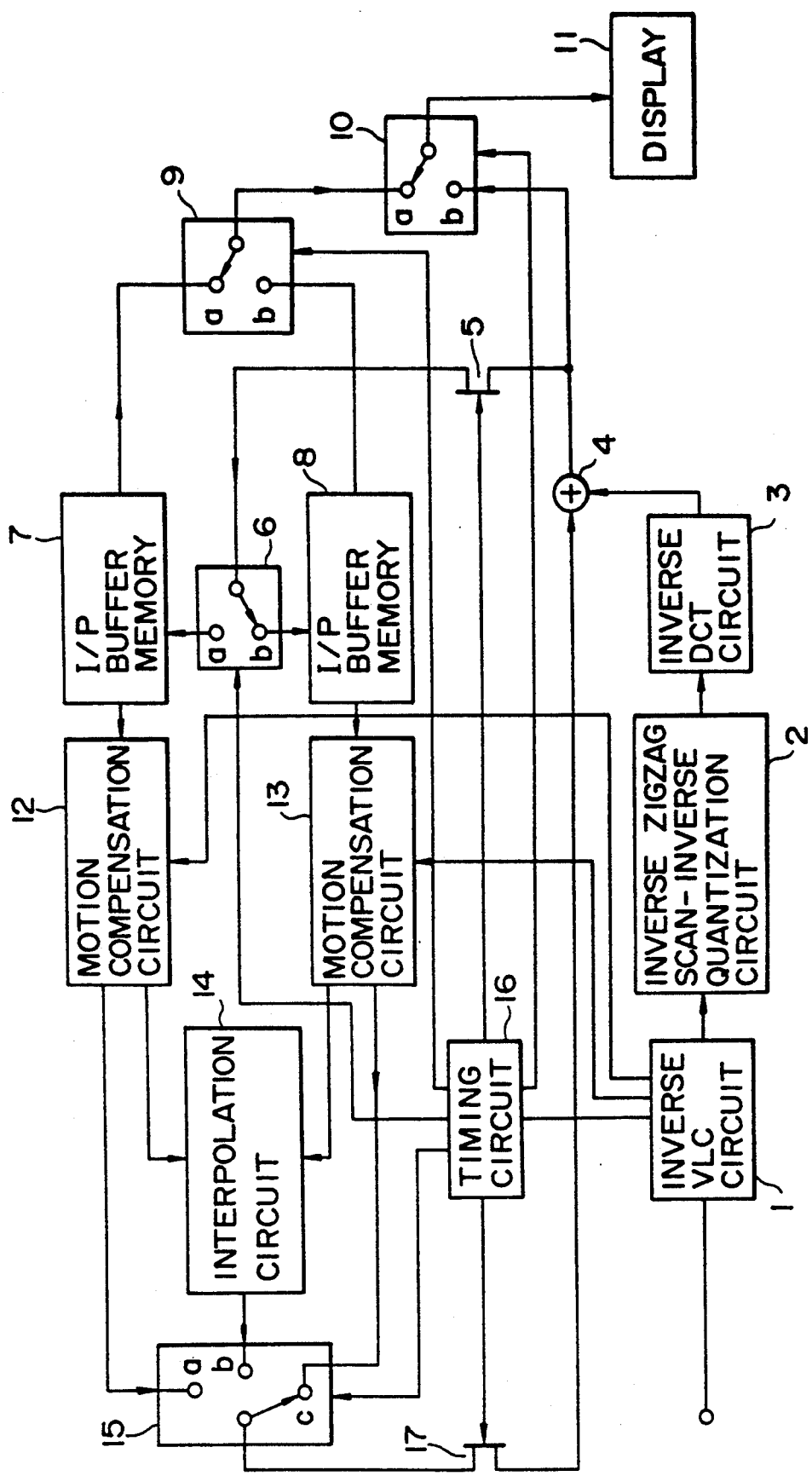
FIG. 2 is a block diagram showing a structure of an embodiment of the picture data decoder of the present invention.
Figure 5:
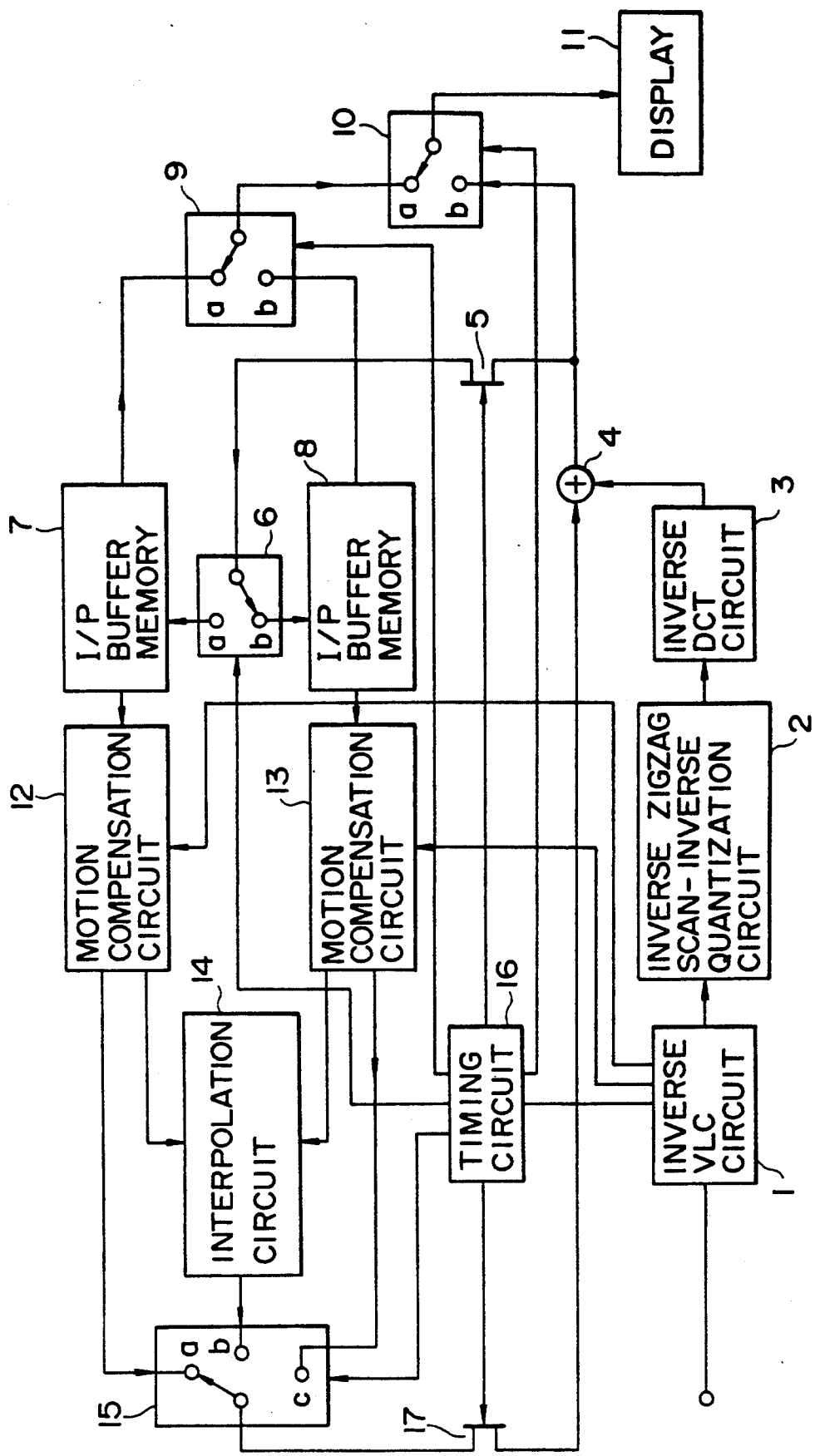
FIG. 5 is a block diagram showing a structure of an example of a conventional picture data decoder.
Figure 6:
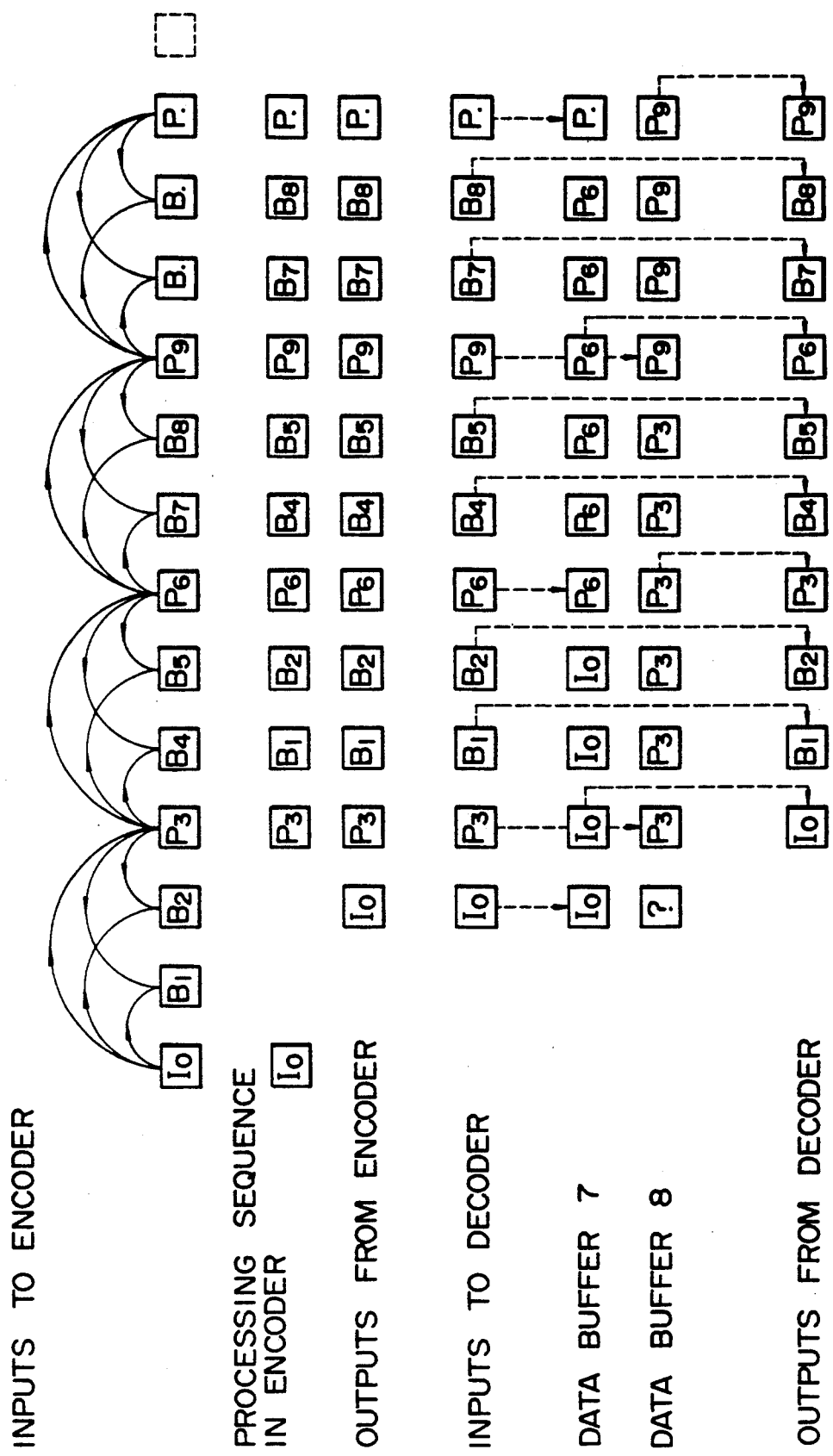
FIG. 6 is a diagram explanatory of operations for encoding and decoding picture data.

FIG. 2 is a block diagram showing a structure of an embodiment of the picture data decoder of the present invention, in which corresponding parts to those in the arrangement of FIG. 5 are denoted by like reference numerals and, hence, description of the same will be generally omitted to avoid duplication. While the basic structure of the present embodiment is the same as that in the case of FIG. 5, the timing of the switch 15 provided by the timing circuit 16 is different from that in the case of FIG. 5.

Figure 1:
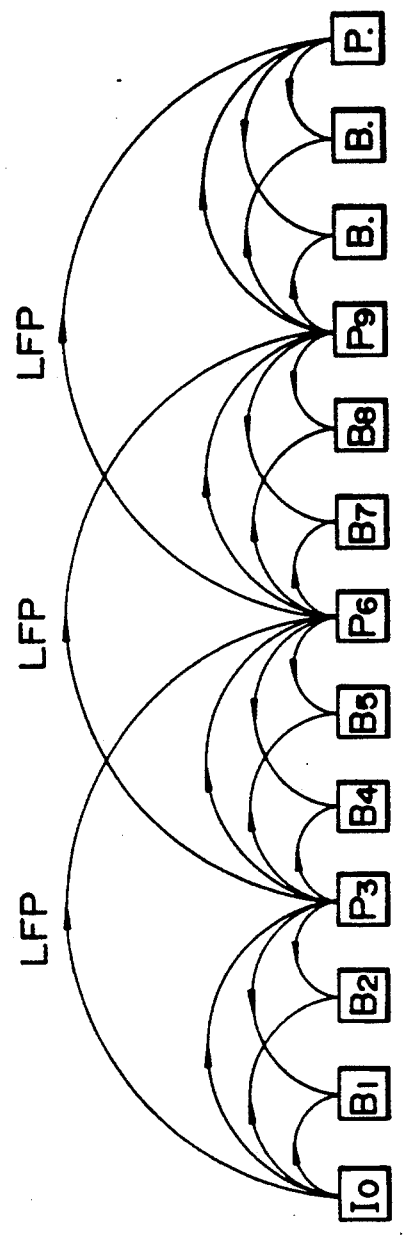
FIG. 1 is a diagram explanatory of a predicting operation performed in an embodiment of FIG. 2.

More specifically, in the present embodiment, as shown in FIG. 1, the picture P6 is decoded utilizing not only the forward picture P3 but also the still more forward picture I0. Similarly, the picture P9 is decoded utilizing not only the forward picture P6 but also the still more forward picture P3. In other words, in the present embodiment, a long forward prediction is performed. Since functioning other than the above is the same as that in the arrangement of FIG. 5, description will be given below of the decoding process according to such long forward prediction.

When pictures are arranged in the sequence of pictures I0, B1, B2, P3, B4, B5, P6, B7, B8, and P9 as described above, they are processed by the encoder in the sequence of I0, P3, B1, B2, P6, B4, B5, P9, B7, B8, and data of the pictures in this sequence are input to the inverse VLC circuit 1 together with the motion vector, quantization width, and prediction mode (information of type). When attention is paid to the I picture and P pictures of them, the picture I0 is stored into the buffer memory 7 and then the picture P3 is stored into the buffer memory 8. Then, the data I0 in the buffer memory 7 is rewritten to the data of the picture P6 and the data of the picture P3 in the buffer memory 8 is rewritten to the data of the picture P9.

Conventionally, when the data of the buffer memory 7 was to be updated, the switch 6 was turned to the side of the contact a and the switch 15 was turned to the side of the contact c (on the side of the other buffer memory 8). In the present embodiment, however, while the switch 6 is held turned to the side of the contact a, the switch 15 is turned to the side of the contact c at the timing during which the data of the other buffer memory 8 is utilized but it is turned to the side of the contact a (on the side of the buffer memory 7) at the timing during which the data of itself is utilized. Similarly, when the data of the buffer memory 8 was to be updated in the past, the switch 6 was turned to the side of the contact b and the switch 15 was turned to the side of the contact a (on the side of the other buffer memory 7). In the present embodiment, however, while the switch 6 is held turned to the side of the contact b, the switch 15 is turned to the side of the contact a at the timing during which the data of the other buffer memory 7 is utilized but it is turned to the side of the contact c (on the side of the buffer memory 8) at the timing during which the data of itself is utilized.

Through such arrangement, it becomes possible for example to generate the picture P6 to be stored into the buffer memory 7 by utilizing the picture P3 (the I or P picture one picture forward) stored in the buffer memory 8 and the picture I0 (the I or P picture two pictures forward) stored in the buffer memory 7, or to generate the picture P9 to be stored into the buffer memory 8 by utilizing the picture P6 (the I or P picture one picture forward) stored in the buffer memory 7 and the picture P3 (the I or P picture two pictures forward) stored in the buffer memory 8.

Figure 4:
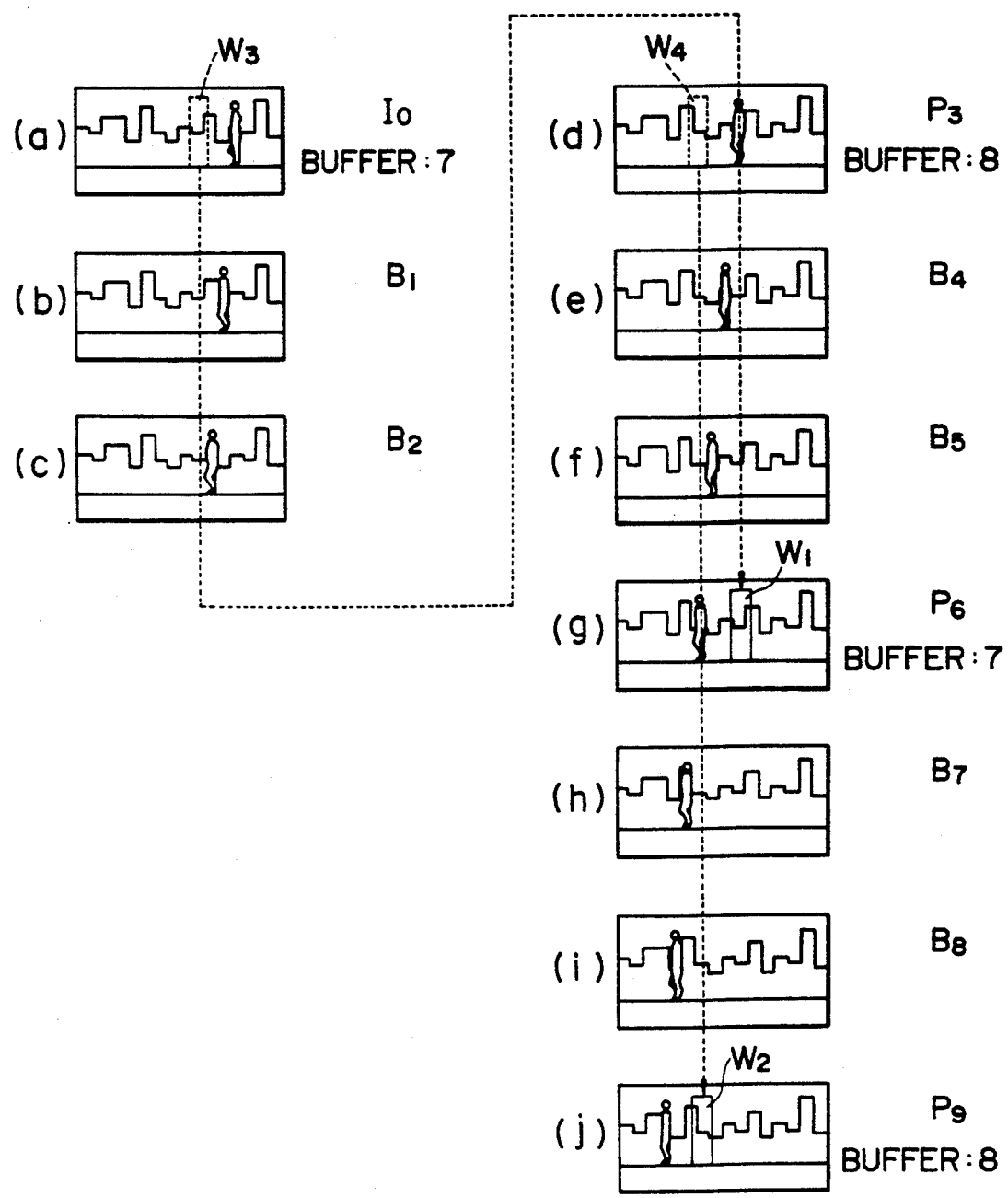
FIG. 4 is a diagram explanatory of states of picture data generated through predicting operations in the embodiment of FIG. 2.
Figure 7:
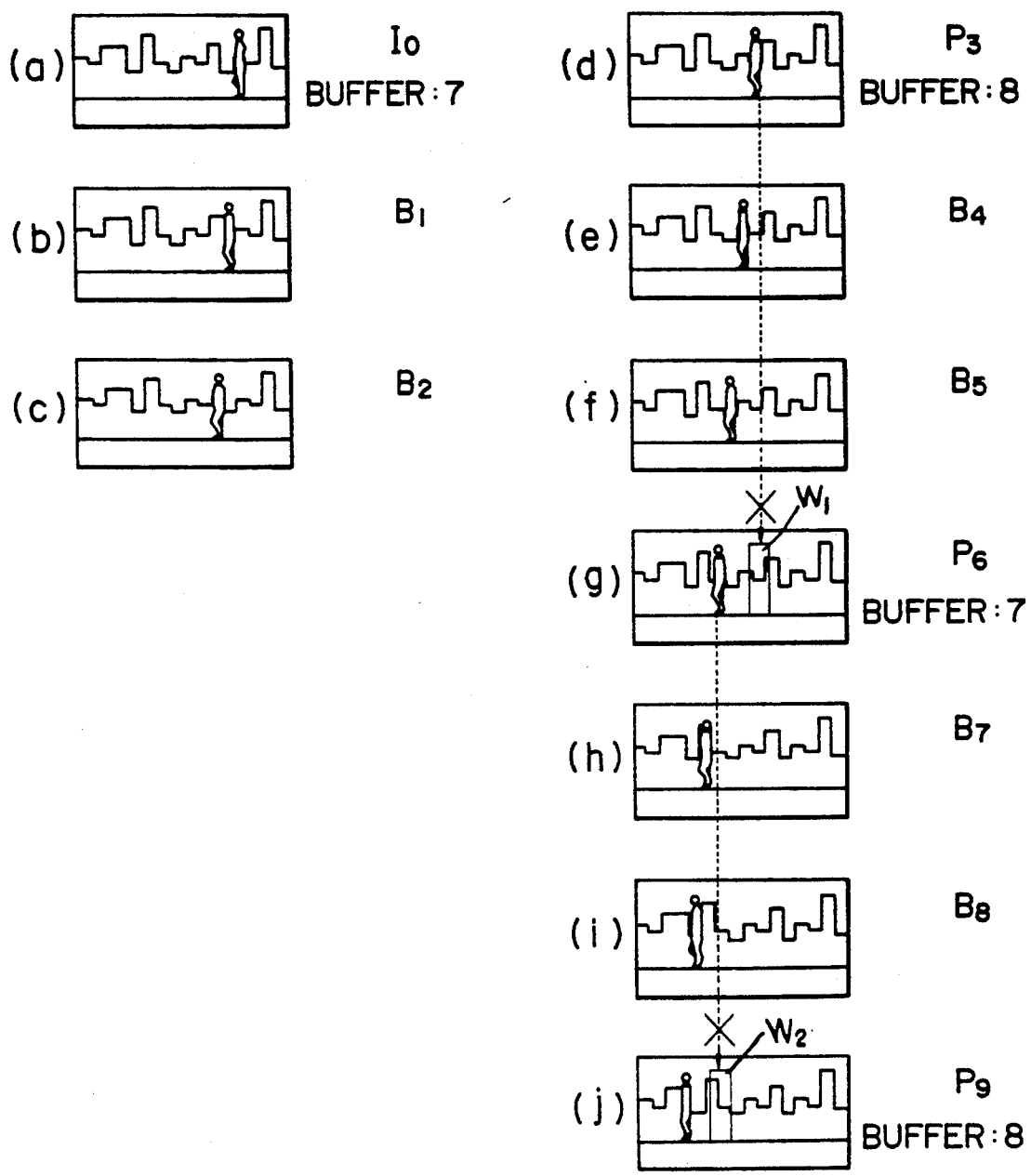
FIG. 7 is a diagram explanatory of states of picture data generated through predicting operations in the example of FIG. 5.

The above will be described on the basis of actually displayed pictures as shown in FIG. 4. The same as in FIG. 7, we take the pictures arranged in the sequence of pictures I0, B1, B2, P3, B4, B5, P6, B7, B8, and P9 which are pictures of a person walking along a street with buildings for a background. Then, if it is attempted to generate the picture of the area indicated by the window W1 in the picture P6 (the picture of buildings in the background) from the P picture P3 one picture forward, because there is located the person in the picture P3 in the position corresponding to the window W1 in the picture P6, the picture of the window W1 (the picture of the buildings in the background) cannot be obtained therefrom. Similarly, when it is attempted to generate the picture in the area indicated by the window W2 in the picture P9 (the picture of buildings in the background) from the picture P6 one picture forward, then, because there is located the person in the picture P6 in the position corresponding to the window W2 in the picture P9, the picture of the window W2 (the picture of the buildings mountain in the background) cannot be obtained therefrom.

However, the picture in the area indicated by the window W1 in the picture P6 (the picture of the buildings in the background) can be obtained from the window W3 in the picture I0 one picture forward of the picture P3 (the P or I picture two pictures forward). Similarly, the picture in the area indicated by the window W2 in the picture P9 (the picture of the buildings in the background) can be obtained from the window W4 in the picture P3 forward of the picture P6 (the P or I picture two pictures forward).

However, to perform motion compensation, pixel data of the picture preceding a predetermined range including the pixel data being updated (the range in which motion compensation is performed) is required. Once pixel data is updated by new pixel data, it becomes unable to perform the motion compensation (the slashed region in later described FIG. 3). Therefore, in the present embodiment, the motion compensation, while a long forward prediction is performed, is forbidden in the slashed region of later described FIG. 3.

FIG. 3 schematically shows a state in which data of the picture I0 stored in the buffer memory 7 are being rewritten by data of the picture P6. The data of the pixel shown in the center of the macro-block indicated by the thick solid line is about to be rewritten by new data. In the case where a short forward prediction is performed (e.g., where data is predicted from an I picture or a P picture one picture forward (not two or more pictures forward), for example a picture P3 is predicted from a picture I0 or a picture P6 is predicted from a picture P3), motion compensation is performed in the range enclosed by the thick solid line. However, in the case where a long forward prediction is performed (e.g. where data is predicted from an I picture or a P picture two pictures forward), motion compensation is forbidden within the range including such a region as indicated by slashes in FIG. 3.

Buffer memories of more than two in number can be provided. By such arrangement, it becomes possible to perform a longer forward prediction.

Although, in the foregoing description, there have been provided a plurality of buffer memories, a single buffer memory divided into a plurality of divisions according to addresses may be provided instead.

As described in the foregoing, according to the picture data decoder as the first aspect of the present invention, it is adapted such that not only picture data stored in one of the storage means is utilized for generating picture data to be stored in the other of the storage means but also picture data stored in one of the storage means is utilized for generating picture data to be newly stored into the same storage means. Accordingly, data can be used more effectively and long forward prediction can be performed so that more accurate picture reproduction can be achieved.

According to the picture data decoder as the second aspect of the present invention, it is adapted such that motion compensation is performed when picture data stored in one of the storage means is utilized for generating picture data to be stored into the other of the storage means and motion compensation is not performed within a predetermined range when picture data stored in one of the storage means is utilized for generating picture data to be newly stored in the one of the storage means. Therefore, it becomes possible to utilize picture data stored in one of the storage means for generating picture data to be stored anew into the same storage means.

Now, another embodiment as the third aspect of the present invention will be described.

Figure 8:
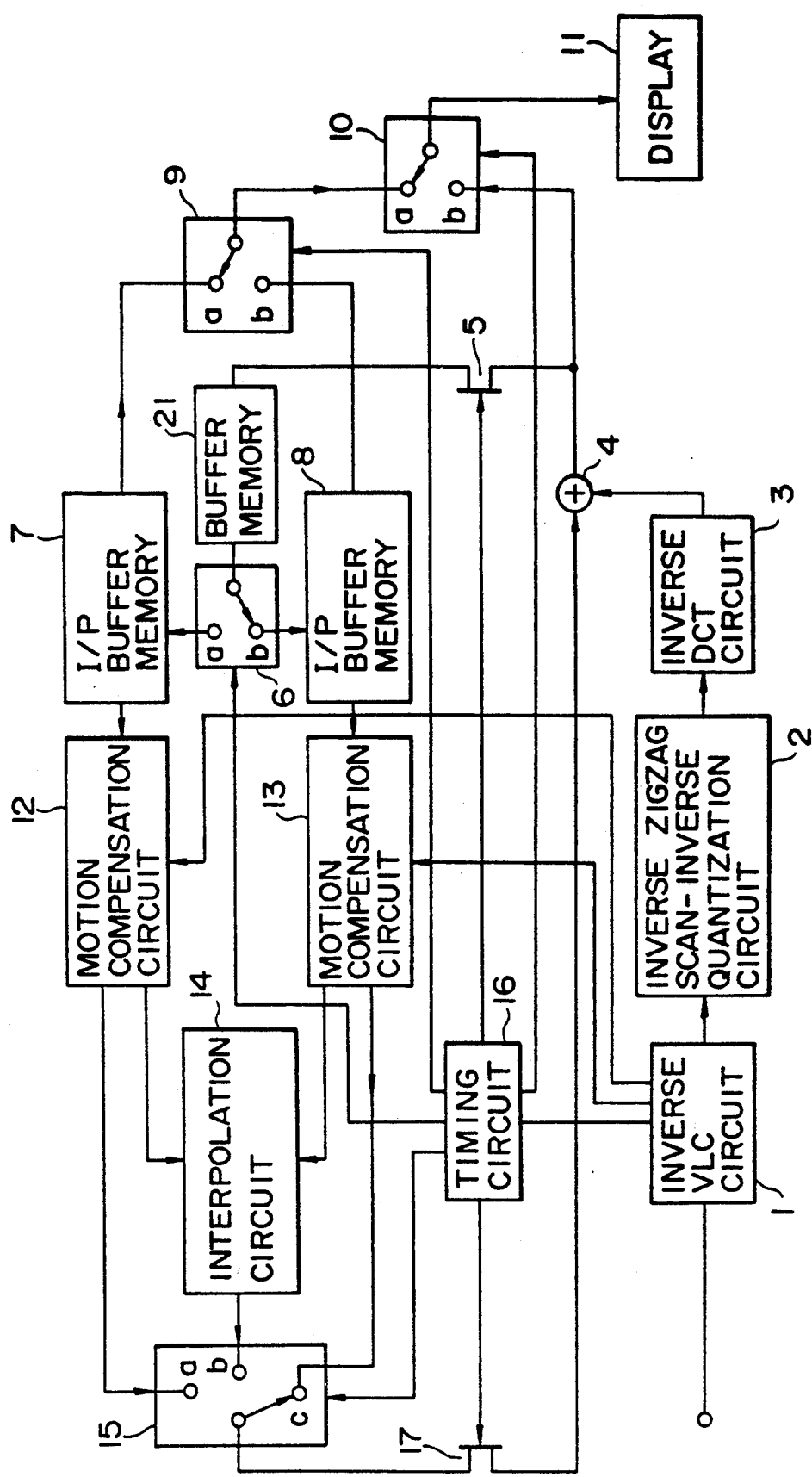
FIG. 8 is a block diagram showing a structure of another embodiment of the picture data decoder of the present invention.

FIG. 8 is a block diagram showing a structure of the present embodiment, in which corresponding parts to those in the arrangement of FIG. 5 are denoted by like reference numerals and, hence, description of the same will be generally omitted to avoid duplication. In the present embodiment, it is adapted such that the output of the gate 5 is stored into a buffer memory 21 and the picture data read from the buffer memory 21 is supplied to the buffer memory 7 or 8 through the switch 6. Other basic structure than the above is the same as that of FIG. 5. However, switching timing of the switch 15 and others given by the timing circuit 16 is different from that in the arrangement of FIG. 5.

While the basic operation in the present embodiment is the same as that in the arrangement of FIG. 5, the present invention is characterized, as shown in FIG. 1, in that the picture P6 is decoded utilizing not only the forward picture P3 but also the still more forward picture I0. Similarly, the picture P9 is decoded utilizing not only the forward picture P6 but also the still more forward picture P3. In other words, in the present embodiment, a long forward prediction is performed. Since other functioning than the above is the same as that in the arrangement of FIG. 5, description will be given below as to the decoding process according to such long forward prediction.

When pictures are arranged in the sequence of pictures I0, B1, B2, P3, B4, B5, P6, B7, B8, and P9 as described above, they are processed by the encoder in the sequence of I0, P3, B1, B2, P6, B4, B5, P9, B7, B8, and data of the pictures in this sequence are input to the inverse VLC circuit 1 together with the motion vector, quantization width, and prediction mode (information of type). When attention is paid to the I picture and P pictures of them, the picture I0 is stored into the buffer memory 7 and then the picture P3 is stored into the buffer memory 8. Then, the data I0 in the buffer memory 7 is rewritten to the data of the picture P6 and the data of the picture P3 in the buffer memory 8 is rewritten to the data of the picture P9.

Conventionally, when the data of the buffer memory 7 was to be updated, the switch 6 was turned to the side of the contact a and the switch 15 was turned to the side of the contact c (on the side of the other buffer memory 8). In the present embodiment, however, while the switch 6 is held turned to the side of the contact a, the switch 15 is turned to the side of the contact c at the timing during which the data of the other buffer memory 8 is utilized but it is turned to the side of the contact a (on the side of the buffer memory 7) at the timing during which the data of itself is utilized. Similarly, when the data of the buffer memory 8 was to be updated in the past, the switch 6 was turned to the side of the contact b and the switch 15 was turned to the side of the contact a (on the side of the other buffer memory 7). In the present embodiment, however, while the switch 6 is held turned to the side of the contact b, the switch 15 is turned to the side of the contact a at the timing during which the data of the other buffer memory 7 is utilized but it is turned to the side of the contact c (on the side of the buffer memory 8) at the timing during which the data of itself is utilized.

Through such arrangement, it becomes possible for example to generate the picture P6 to be stored into the buffer memory 7 by utilizing the picture P3 (the I or P picture one picture forward) stored in the buffer memory 8 and the picture I0 (the I or P picture two pictures forward) stored in the buffer memory 7, or to generate the picture P9 to be stored into the buffer memory 8 by utilizing the picture P6 (the I or P picture one picture forward) stored in the buffer memory 7 and the picture P3 (the I or P picture two pictures forward) stored in the buffer memory 8.

Figure 11:
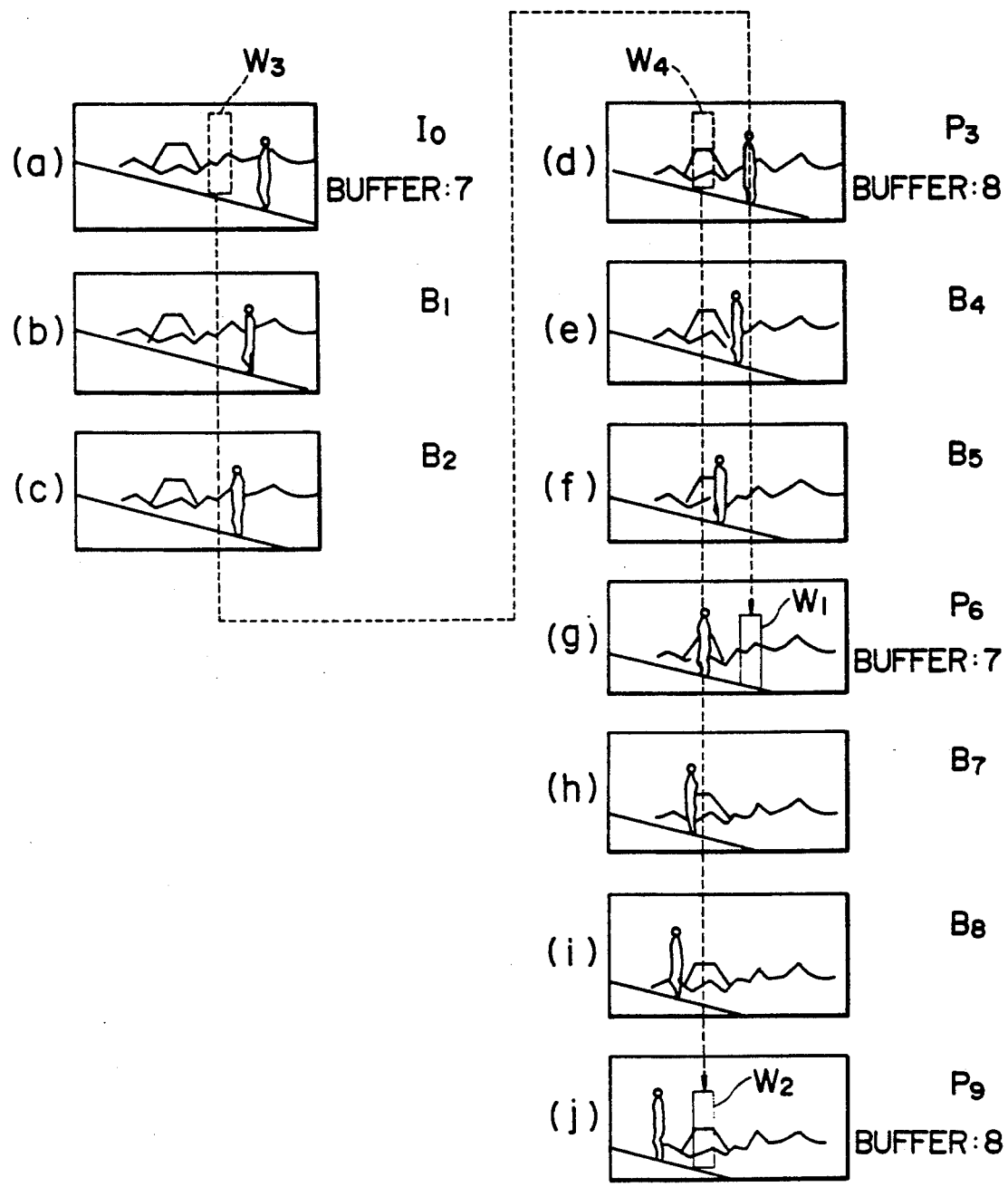
FIG. 11 is a diagram explanatory of states of picture data generated through predicting operations in the embodiment of FIG. 8.

The above will be described on the basis of actually displayed pictures as shown in FIG. 11. We now take as an example the pictures arranged in the sequence of pictures I0, B1, B2, P3, B4, B5, P6, B7, B8, and P9 which are pictures of a person ascending a slope. Then, if it is attempted to generate the picture of the area indicated by the window W1 in the picture P6 (the picture of a range of mountains in the background) from the P picture P3 one picture forward, then, because there is located the person in the picture P3 in the position corresponding to the window W1 in the picture P6, the picture of the window W1 (the picture of the range of mountains in the background) cannot be obtained therefrom. Similarly, when it is attempted to generate the picture in the area indicated by the window W2 in the picture P9 (the picture of the separate mountain in the background) from the picture P6 one picture forward, then, because there is located the person in the picture P6 in the position corresponding to the window W2 in the picture P9, the picture of the window W2 (the picture of the separate mountain in the background) cannot be obtained therefrom.

However, the picture in the area indicated by the window W1 in the picture P6 (the picture of the range of mountains in the background) can be generated from the window W3 of the picture data in the picture I0 one picture forward of the picture P3 (the P or I picture two pictures forward). Similarly, the picture in the area indicated by the window W2 in the picture P9 (the picture of the separate mountain in the background) can be generated from the window W4 of the picture data in the picture P3 forward of the picture P6 (the P or I picture two pictures forward).

However, to perform motion compensation, pixel data of the picture preceding a predetermined range including the pixel data being updated (macro-block) is required. Once pixel data is updated by new pixel data, it becomes unable to perform the motion compensation. Therefore, in order to have the motion compensating process performed smoothly, the picture data is delayed by the buffer memory 21 at least a period of time corresponding to the motion compensation process before it is input to the buffer memory 7 or 8.

Figure 9:
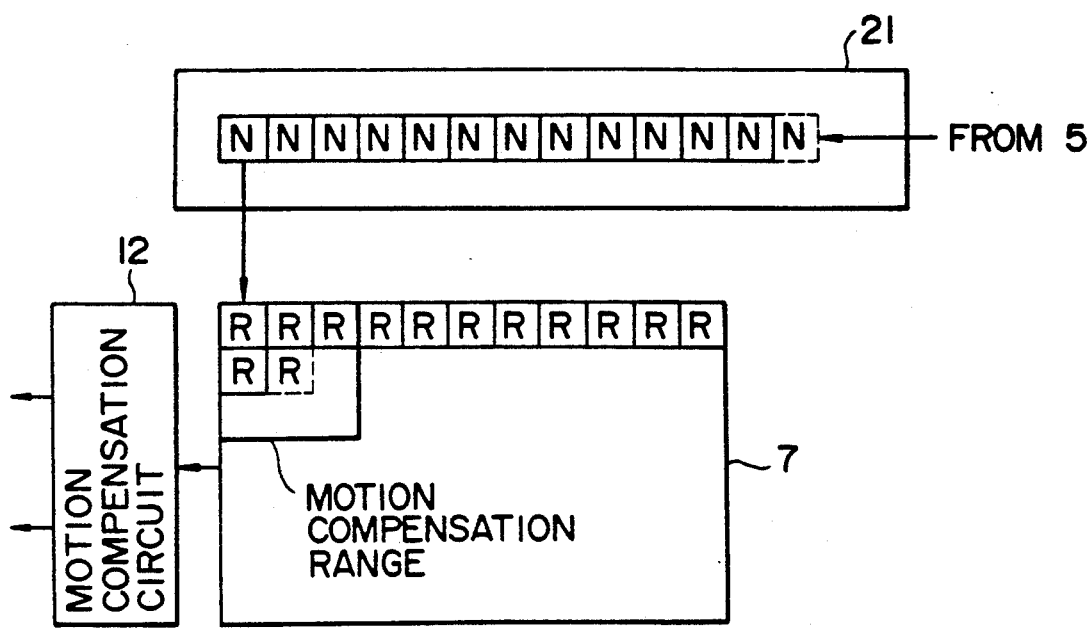
FIG. 9 is a diagram explanatory of operation for writing data into a buffer memory 7 in FIG. 8.
Figure 10:
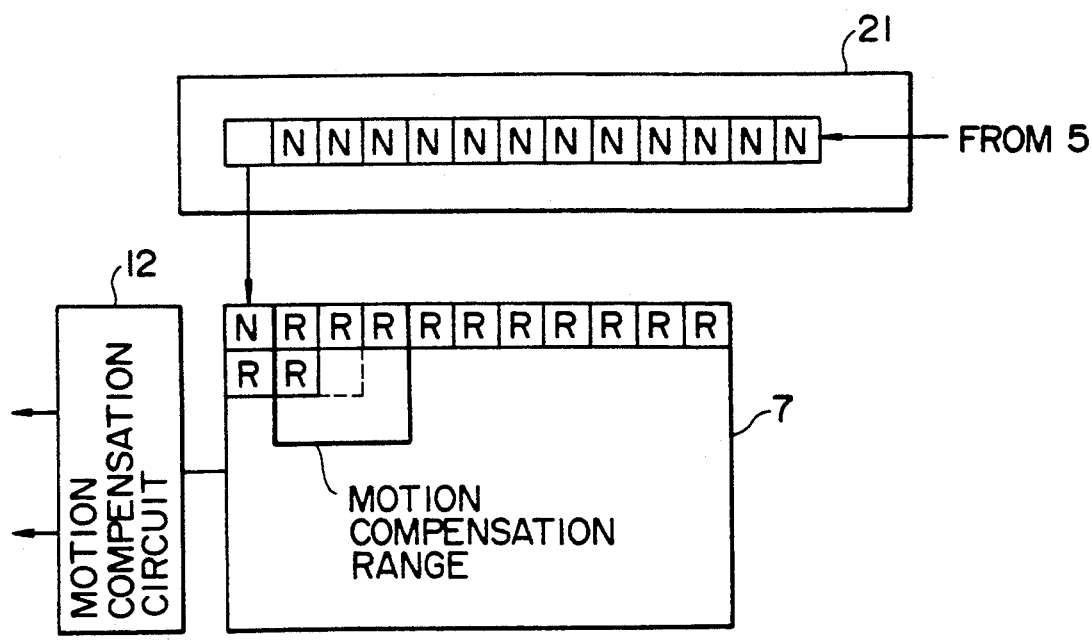
FIG. 10 is a diagram explanatory of operation following that in FIG. 9 for writing data into the buffer memory 7.

FIG. 9 and FIG. 10 schematically show the states where the data of picture R (for example the picture I0) stored in the buffer memory 7 (or, the buffer memory 8) is being rewritten by the data of picture N (for example the picture P6) (the switch 6 is not shown in these diagrams for convenience). Now, supposing that the pixel data of the first picture R in the buffer memory 7, as shown in FIG. 9, is updated by the pixel data of the new picture N, as shown in FIG. 10, the range of motion compensation enclosed by the thick solid line shifts from the state shown in FIG. 9 to the state shown in FIG. 10. More specifically, the macro-block as the object of the processing within that range will sequentially shift on the buffer memory from left to right and from top to bottom, and according to this movement, the range of motion compensation will also sequentially shift. The pixel data coming out of the range of motion compensation are sequentially updated by new pixel data. The capacity (delay time) of the buffer memory 21 is set up in accordance with the range of the motion vector and the number of the macroblocks for each row.

In the picture data decoder of the present embodiment as described above, it is adapted such that picture data are alternately stored into a pair of storage means after they are delayed at least a period of time corresponding to the motion compensation and the picture data to be newly stored in one of the pair of the storage means is generated by utilizing the picture data stored in the one of the pair of the storage means. Accordingly, it becomes possible to achieve a long forward prediction while performing motion compensation so that more accurate picture reproduction can be realized.

What is claimed is:

1. A video image data decoding apparatus comprising:

a plurality of storage means for storing a plurality of sets of successive decoded intra coded picture data and/or sets of successive forward prediction coded picture data;

storage control means for causing said decoded intra coded picture data and/or sets of successive forward prediction coded picture data to be sequentially stored in said plurality of storage means; and generation means utilizing picture data stored in one storage means of said plurality of storage means for generating picture data to be stored into another one of said plurality of storage means and also utilizing picture data stored in one storage means for generating picture data to be newly stored back into the same storage means.

2. A video image data decoding apparatus according to claim 1, wherein said generation means includes means for performing motion compensation when said generation means utilizes picture data stored in said one storage means for generating picture data to be stored into said another one of said plurality of storage means, and means for preventing said generation means to perform motion compensation within a predetermined range when said generation means utilizes picture data stored in said one storage means for generating picture data to be newly stored back into said one storage means.

3. A video image data decoding apparatus according to claim 1 or 2, wherein said plurality of storage means are formed of a first buffer memory and a second buffer memory and said storage control means is formed of a first switching circuit, and wherein said picture data are selectively input to said first and second buffer memories switched by said first switching circuit.

4. A video image data decoding apparatus according to claim 3, wherein said generation means comprises at least a pair of motion compensation circuits adapted to receive output signals from said first and second buffer memories and an interpolation circuit adapted to receive outputs from said motion compensation circuits.

5. A video image data decoding apparatus according to claim 4, wherein said generation means further comprises a second switching circuit adapted to select a signal from output signals of said pair of motion compensation circuits and an output signal of said interpolation circuit.

6. A video image data decoding apparatus according to claim 5, wherein, when the content of one buffer memory of said first and second buffer memories is updated, said first switching circuit is turned to a connection corresponding to the one buffer memory which is updated, and in the meantime, said second switching circuit is, at the timing during which data in said another buffer memory is utilized, turned to the other buffer memory and, at the timing during which data in the one buffer memory is utilized, turned to the one buffer memory.

7. A video image data decoding apparatus according to claim 6, wherein said motion compensation is performed within a predetermined range including pixel data being updated such that the picture data stored in one of said storage means is processed in units of macroblocks.

8. A video image data decoding apparatus comprising:
- a pair of storage means for storing decoded intra coded picture data and forward prediction coded picture data;
- delay means for delaying picture data supplied to said storage means by at least a period of time corresponding to a motion compensation time period;
- storage control means for causing picture data delayed by said delay means to be alternately stored in said pair of storage means; and
- generating means for generating picture data to be newly stored into one of said pair of storage means by utilizing picture data stored in the one of said pair of storage means.

9. A video image data decoding apparatus according to claim 8, wherein said pair of storage means are formed of a first buffer memory and a second buffer memory, said delay means is formed of a third buffer memory, and said storage control means is formed of a first switching circuit, and wherein
    said picture data are selectively input to said first and second buffer memories switched by said first switching circuit and through said third buffer memory switch.

10. A video image data decoding apparatus according to claim 9, wherein said generating means comprises at least a pair of motion compensation circuits adapted to receive output signals from said first and second buffer memories and an interpolation circuit adapted to receive outputs from said motion compensation circuits.

11. A video image data decoding apparatus according to claim 10, wherein said generation means further comprises a second switching circuit adapted to select a signal from output signals of said pair of motion compensation circuits and an output signal of said interpolation circuit.

12. A video image data decoding apparatus according to claim 11, wherein, when the content of one buffer memory of said first and second buffer memories is updated, said first switching circuit is turned to the side of the one buffer memory which is updated, and in the meantime, said second switching circuit is, at the timing during which data in the other buffer memory is utilized, turned to the other buffer memory and, at the timing during which data in the one buffer memory is utilized, turned to the one buffer memory.

13. A video image data decoding apparatus according to claim 12, wherein said motion compensation is performed within a predetermined range including pixel data being updated such that the picture data stored in one of said storage means is processed in units of macroblocks.

* * * * *